(12) United States Patent
Ueno et al.

(10) Patent No.: US 8,350,547 B2
(45) Date of Patent: Jan. 8, 2013

(54) DC TO DC CONVERTER

(75) Inventors: Takeshi Ueno, Kanagawa-ken (JP); Tetsuro Itakura, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 6 days.

(21) Appl. No.: 12/878,271

(22) Filed: Sep. 9, 2010

(65) Prior Publication Data

US 2011/0235367 A1 Sep. 29, 2011

(30) Foreign Application Priority Data

Mar. 26, 2010 (JP) ................................ P2010-073703

(51) Int. Cl.
*G05F 1/00* (2006.01)
(52) U.S. Cl. ........................................ 323/282; 323/284
(58) Field of Classification Search .................. 323/222, 323/223, 271, 282, 283, 284, 285
See application file for complete search history.

(56) References Cited

U.S. PATENT DOCUMENTS

| | | | |
|---|---|---|---|
| 6,963,190 B2 * | 11/2005 | Asanuma et al. | 323/283 |
| 2004/0240238 A1 * | 12/2004 | Jauregui et al. | 363/50 |
| 2009/0284235 A1 * | 11/2009 | Weng et al. | 323/222 |
| 2011/0089917 A1 * | 4/2011 | Chen et al. | 323/282 |

FOREIGN PATENT DOCUMENTS

| | | |
|---|---|---|
| JP | 2005-80424 | 3/2005 |
| JP | 2005-86845 | 3/2005 |
| JP | 2009-177911 | 8/2009 |

OTHER PUBLICATIONS

S.-C. Tan et al., "On the Practical Design of a Sliding Mode Voltage Controlled Buck Converter," IEEE Transactions on Power Electronics, vol. 20, No. 2, pp. 425-437 (Mar. 2005).
Notification of Reasons for Refusal issued by the Japanese Patent Office on Feb. 21, 2012, for Japanese Patent Application No. 2010-073703, and English-language translation thereof.

* cited by examiner

*Primary Examiner* — Nguyen Tran
(74) *Attorney, Agent, or Firm* — Finnegan, Henderson, Farabow, Garrett & Dunner, L.L.P.

(57) ABSTRACT

A DC to DC converter includes an input terminal, an output terminal, first and second switches, an inductor, a smoothing unit, a first impedance element, a first resistor element, an operational amplifier and a control unit. The first switch is connected to the input terminal. The second switch is connected to the first switch and a ground terminal. The inductor is connected to the first switch and the output terminal. The smoothing unit is connected to the inductor and the ground terminal. The first impedance element is connected to the smoothing unit. The first resistor element is connected in series with the first impedance element. The operational amplifier is connected to the first impedance element. Reference voltage is added to the operational amplifier. The control unit controls the first and second switches according to a control signal outputted from the operational amplifier.

10 Claims, 12 Drawing Sheets

DC TO DC CONVERTER

CROSS-REFERENCE TO RELATED APPLICATION

This application is based upon and claims the benefit of priority from Japanese Patent Application No. 2010-073703, filed on Mar. 26, 2010, the entire contents of which are incorporated herein by reference.

FIELD

Embodiments described herein relate generally to a DC to DC convertor.

BACKGROUND

A DC to DC (direct current to direct current) converter using a sliding mode is disclosed in "On the practical design of a sliding mode voltage controlled buck converter", S. C. Tan, et. al., IEEE Transactions on Power Electronics, Volume 20, pp. 425-437, 2005. A switch of the DC to DC converter by monitoring an output voltage "vc" and a current "ic" flowing in a smoothing capacitor without using an external clock. The DC to DC converter can quickly respond to variation of the current flowing in a load unit connected to the DC to DC converter even without the external clock.

However, the DC to DC converter monitors the output voltage "vc" and the current "ic" individually. Therefore, circuit size of the DC to DC converter becomes larger.

BRIEF DESCRIPTION OF THE DRAWINGS

Aspects of this disclosure will become apparent upon reading the following detailed description and upon reference to the accompanying drawings. The description and the associated drawings are provided to illustrate embodiments of the invention and not limited to the scope of the invention.

DETAILED DESCRIPTION

According to one aspect of the invention, a DC to DC converter for converting an input voltage into an output voltage, the output voltage being lower than the input voltage, includes an input terminal into which the input voltage is inputted; an output terminal from which the output voltage is outputted; a first switch to switch on and off, one terminal of the first switch being connected to the input terminal; a second switch to switch on and off, one terminal of the second switch being connected to the other terminal of the first switch, the other terminal of the second switch being connected to a ground terminal; an inductor, one terminal of the inductor being connected to the first switch, the other terminal of the inductor being connected to the output terminal; a smoothing unit, one terminal of the smoothing unit being connected to the other terminal of the inductor, the other terminal of the smoothing unit being connected to the ground terminal; a first impedance element, one terminal of the first impedance element being connected to one terminal of the smoothing unit; a first resistor element, one terminal of the first resistor element being connected to one terminal of the first impedance element, the other terminal of the first resistor element being connected to the other terminal of the first impedance element; an operational amplifier having an inverting input terminal being connected to the other terminal of the first impedance element, a non-inverting input terminal being applied with a reference voltage, and a control output terminal to obtain a control signal; and a control unit configured to control the first and second switches using the control signal of the operational amplifier.

The embodiments will be explained with reference to the accompanying drawings.

Description of the First Embodiment

Figure 1:
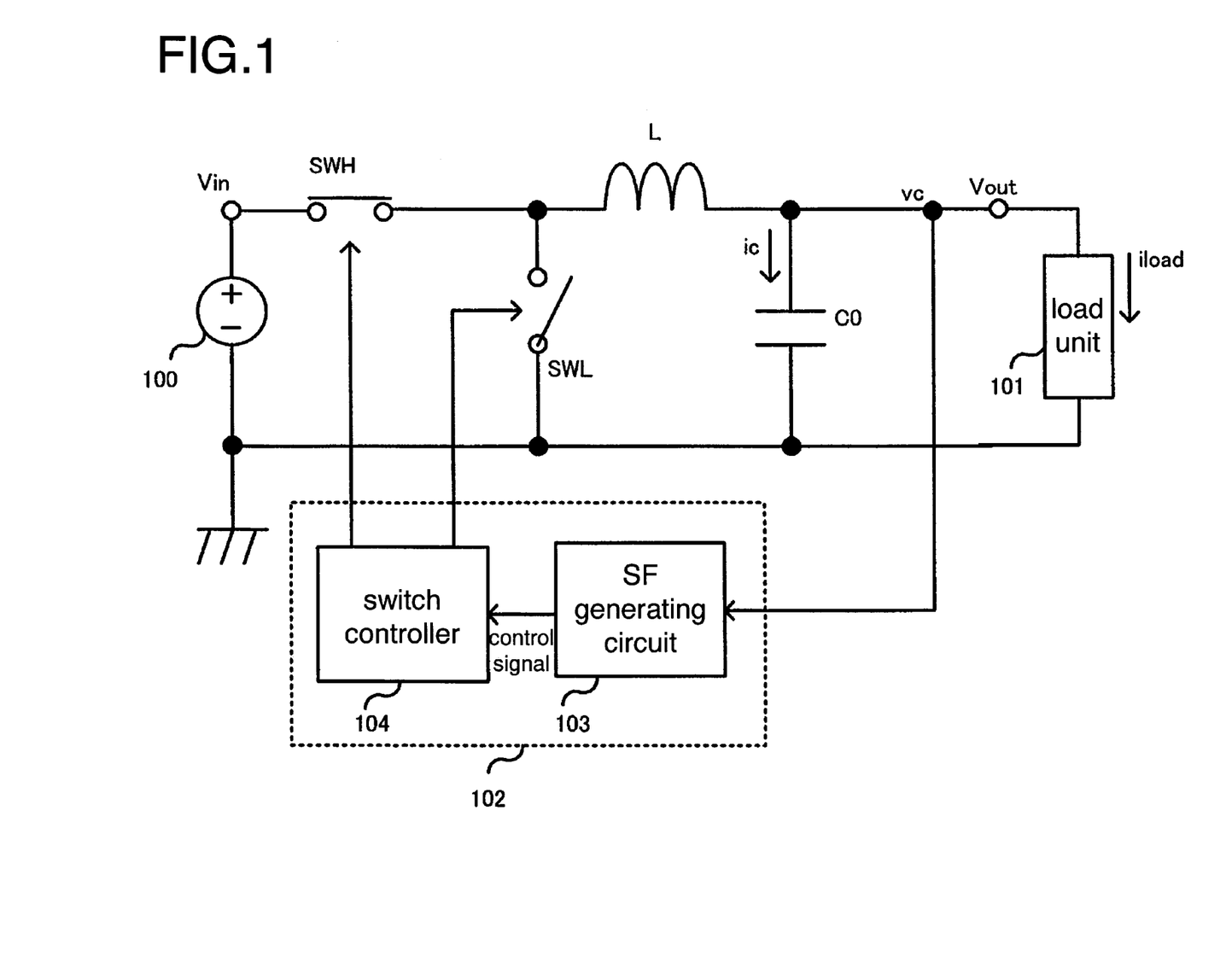
FIG. 1 is a diagram showing a configuration of a DC to DC converter according to the first embodiment.

FIG. 1 is a diagram showing a configuration of a DC to DC converter according to the first embodiment.

The DC to DC converter converts down an input voltage "vi" to an output voltage "vc". The input voltage "vi" is inputted from a voltage source 100. The output voltage "vc" is lower than the input voltage "vi". The DC to DC converter outputs the output voltage "vc" to a load unit 101. The DC to DC converter includes an input terminal "Vin" and an output terminal "Vout". The input voltage "vi" is inputted into the input terminal "Vin". The output voltage "vc" is outputted from the output terminal "Vout". The DC to DC converter further includes a first switch "SWH" and a second switch "SWL". One terminal of the first switch "SWH" is connected to the input terminal "Vin". One terminal of the second switch "SWL" is connected to the other terminal of the first switch "SWH". The other terminal of the second switch "SWL" is connected to a ground terminal. Both the first switch "SWH" and the second switch "SWL" switch on and off. The DC to DC converter further includes an inductor "L" and a smoothing unit. One terminal of the inductor "L" is connected to the first switch "SWH". The other terminal of the inductor "L" is connected to the output terminal "Vout". One terminal of the smoothing unit is connected to the inductor "L". The other terminal of the smoothing unit is connected to the ground terminal. In FIG. 1, the smoothing unit is a capacitor "C0".

The DC to DC converter further includes a control unit 102 to control the first switch "SWH" and the second switch "SWL". The control unit 102 includes a SF (Switching Function) generating circuit 103 and a switch controller 104. The SF generating circuit 103 generates the switching function (SF). The SF is used as a control signal to control the first switch "SWH" and the second switch "SWL". In the first embodiment, the control signal is proportional to the SF as shown in equations (1) and (2) later.

Figure 2:
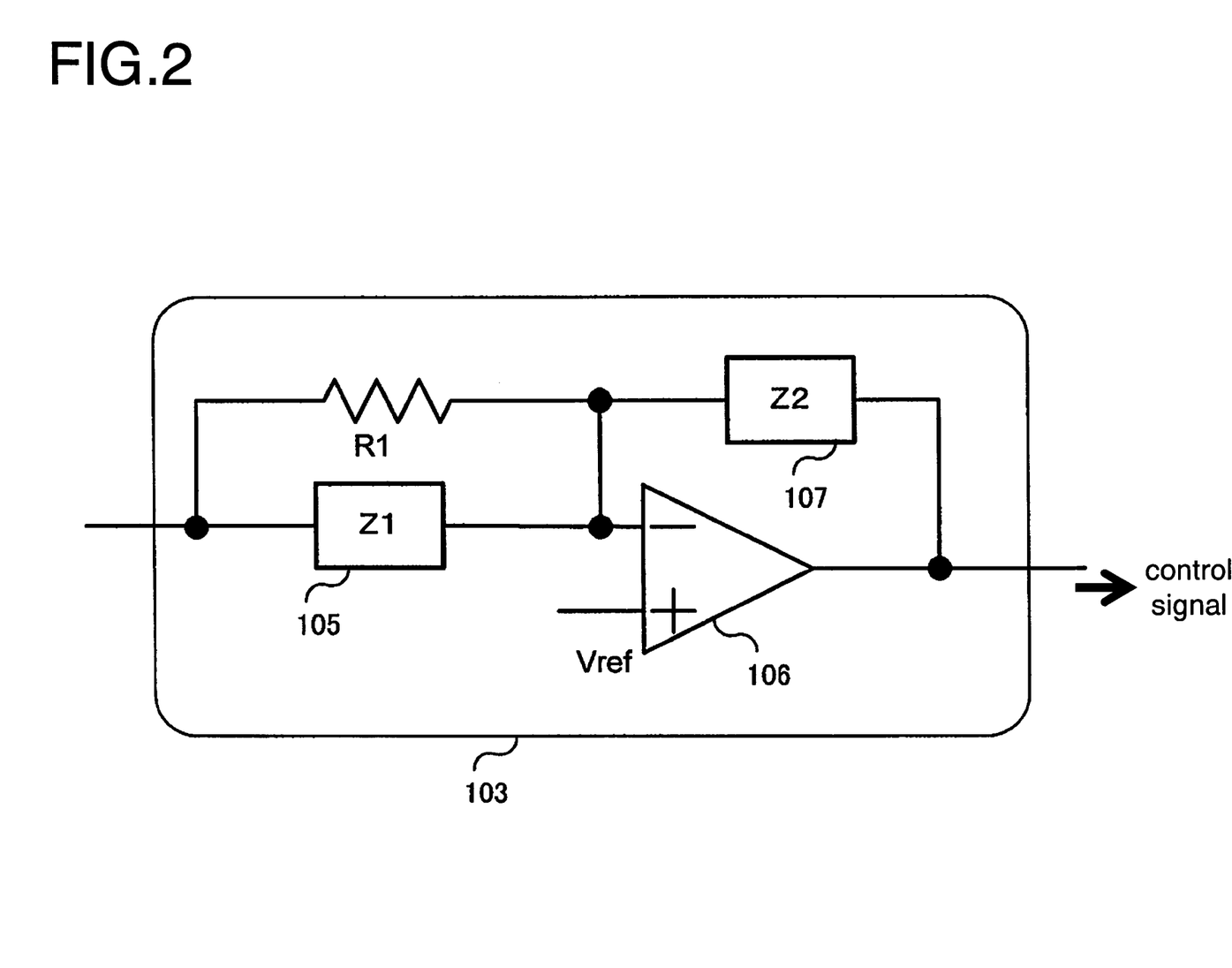
FIG. 2 is a diagram showing a configuration of a SF generating circuit.

The SF generating circuit 103 is described with reference to FIG. 2. As shown in FIG. 2, the SF generating circuit 103 includes a first impedance element 105 and a first resistor element "R1". One terminal of the first impedance element 105 is connected to one terminal of the capacitor "C0". One terminal of the first impedance element 105 is also connected to one terminal of the first resistor element "R1". The other terminal of the first impedance element 105 is connected to the other terminal of the first resistor element "R1". The first impedance element 105 is connected in parallel to the first resistor element "R1".

The SF generating circuit 103 further includes an operational amplifier 106. An inverting input terminal of the operational amplifier 106 is connected to the first impedance element 105. A reference voltage "Vref" is applied to a non-inverting input terminal of the operational amplifier 106. A control output terminal (third terminal) of the operational amplifier 106 outputs a control signal. The control signal is described later. Moreover, the SF generating circuit 103 further includes a second impedance element 107. One terminal of the second impedance element 107 is connected to the other terminal of the first resistor element "R1". The other terminal of the second impedance element 107 is connected to the control output terminal of the operational amplifier 106.

Figure 3:
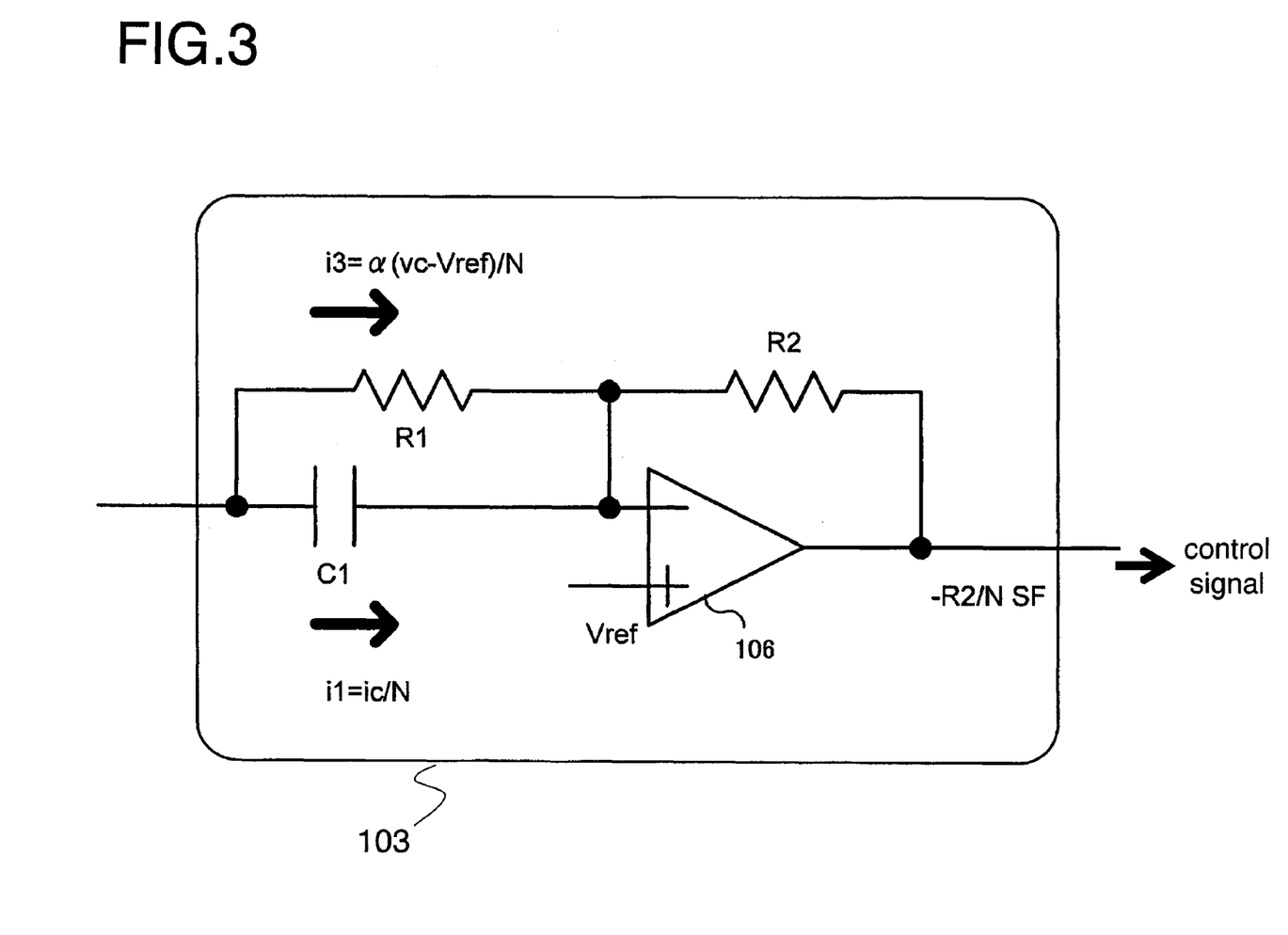
FIG. 3 is a diagram showing an example of the SF generating circuit.

FIG. 3 is a diagram showing an example of the SF generating circuit. In the example of FIG. 3, the first impedance element 105 is a first capacitor "C1" and the second impedance element 107 is a second resistor element "R2". In the first embodiment, the DC to DC converter adopts the SF generating circuit 103 shown in FIG. 3. In FIG. 1, the switch controller 104 has a comparator (not shown) to judge a polarity of the control signal. The switch controller 104 controls the first switch "SWH" and the second switch "SWL" according to the polar character of the control signal.

Next, we will explain detail of the DC to DC converter.

The first switch "SWH" and the second switch "SWL" act alternatively. If the first switch "SWH" is on, the second switch "SWL" is off. On the other hand, if the first switch "SWH" is off, the second switch "SWL" is on.

If the first switch "SWH" is on and the second switch "SWL" is off, the input voltage "vi" is added to one terminal of the inductor L. On the other hand, if the first switch "SWH" is off and the second switch "SWL" is on, a ground voltage (it equals to 0 [V]) is added to one terminal of the inductor L. This means that a voltage having a rectangular wave is added to one terminal of the inductor L.

The average voltage of the rectangular wave becomes a DC voltage. The DC voltage depends on a duty ratio which is difference between on and off of the first switch "SWH" and the second switch "SWL". The DC voltage is always lower than the input voltage "vi". Accordingly, the DC to DC converter realizes decreasing the input voltage "vi" by alternately switching the first and second switches on and off.

A DC component is obtained from the voltage having the rectangular wave by passing through a low pass filter including the inductor "L" and the capacitor "C0". As a result, the voltage having the rectangular wave is converted to the output voltage "vc".

Next, we will explain how to control the first switch "SWH" and the second switch "SWL".

The SF generating circuit 103 generates the switching function (SF) based on the output voltage "vc", the current "ic", and the reference voltage "Vref". The SF is expressed by an equation (1).

$$SF = \alpha(vc - Vref) + ic \text{ (where, } \alpha > 0\text{)} \quad (1)$$

The reference voltage "Vref" is a target voltage of the output voltage "vc". The SF generating circuit 103 sends the control signal to the switch controller 104.

Next, we describe how the SF generating circuit 103 generates the control signal. The voltage at the other terminal of the first capacitor C1 equals to the reference voltage Vref which is an AC ground, by the operational amplifier 106. Therefore, the capacitor "C0" and the first capacitor "C1" are connected in parallel to each other in an AC manner. The AC-component of the output voltage "vc" is applied to the both terminals of the capacitor "C0" and the both terminals of the first capacitor "C1". An example, that capacitance of the capacitor "C0" is expressed as C0, capacitance of the first capacitor "C1" is expressed as C1, and C1=C0/N (N>0), is considered. In this case, a current "i1" flowing in the first capacitor "C1" is expressed as (ic/N).

The voltage of (vc−Vref) is applied to both terminals of the first resistor element "R1". If the resistance value of the first resistor element "R1" is expressed as R1 and (R1=N/α), a current "i3" flowing in the first resistor element "R1" is expressed as α(vc−Vref)/N.

Sum of the currents "i1" and "i3" flows into the second resistor element "R2". Therefore, the control signal, which is outputted from the control output terminal of the operational amplifier 106, is expressed by the equation (2).

$$-R2(\alpha(vc - Vref)/N + ic/N) = -R2/N \text{ SF} \quad (2)$$

The SF generating circuit 103 shown in FIG. 3 sends the control signal to the switch controller 104 through the control output terminal. The control signal may be proportional to the SF calculated by the equation (1).

The switch controller 104 judges polarity of the control signal with using a comparator (not shown). If the control signal is a positive value (SF<0), the switch controller 104 turns the first switch "SWH" on and the second switch "SWL" off. On the other hand, if the control signal is a negative value (SF>0), the switch controller 104 turns the first switch "SWH" off and the second switch "SWL" on.

Figure 4:
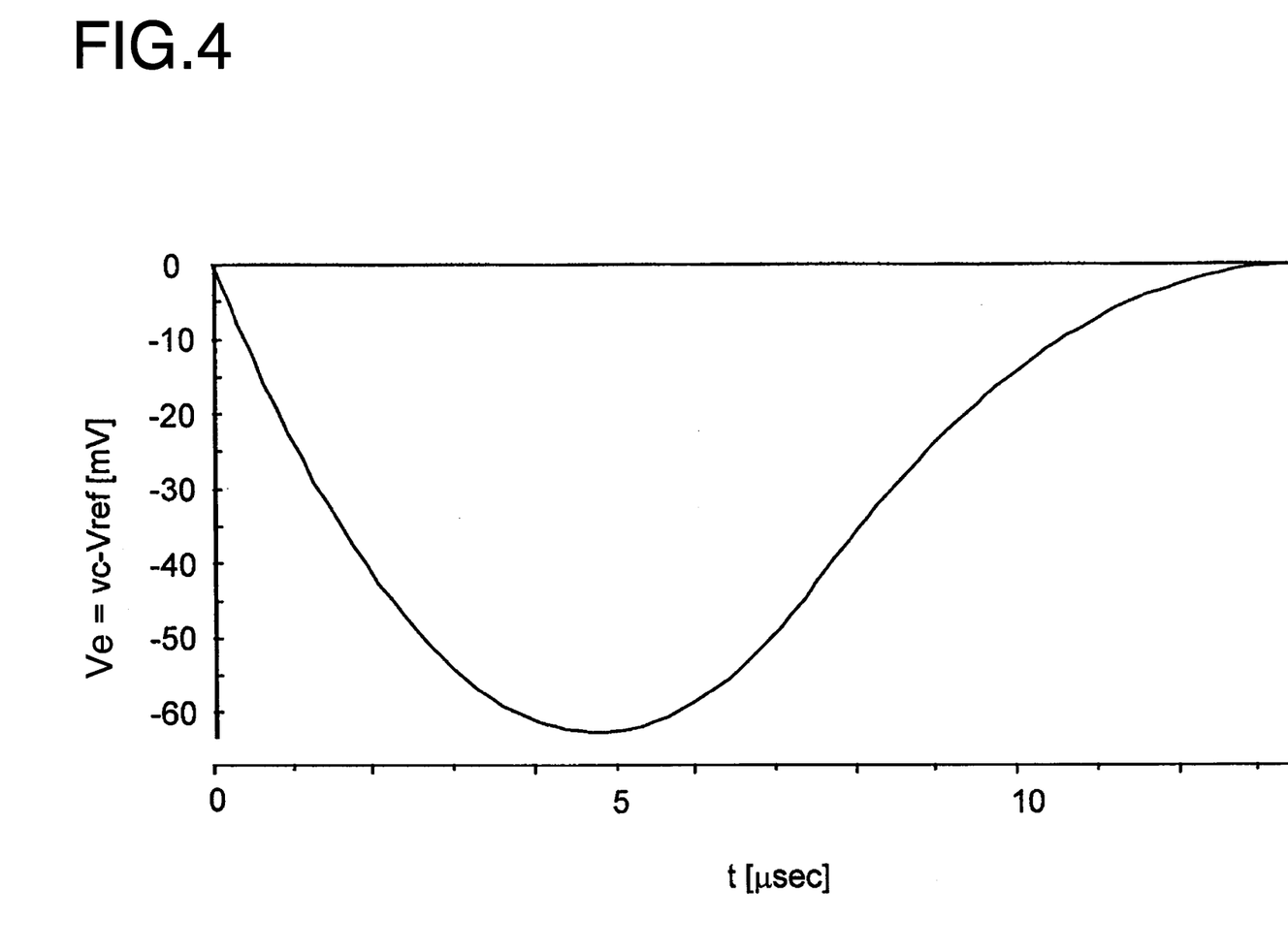
FIG. 4 is a diagram showing a performance of an error voltage "Ve"
Figure 5:
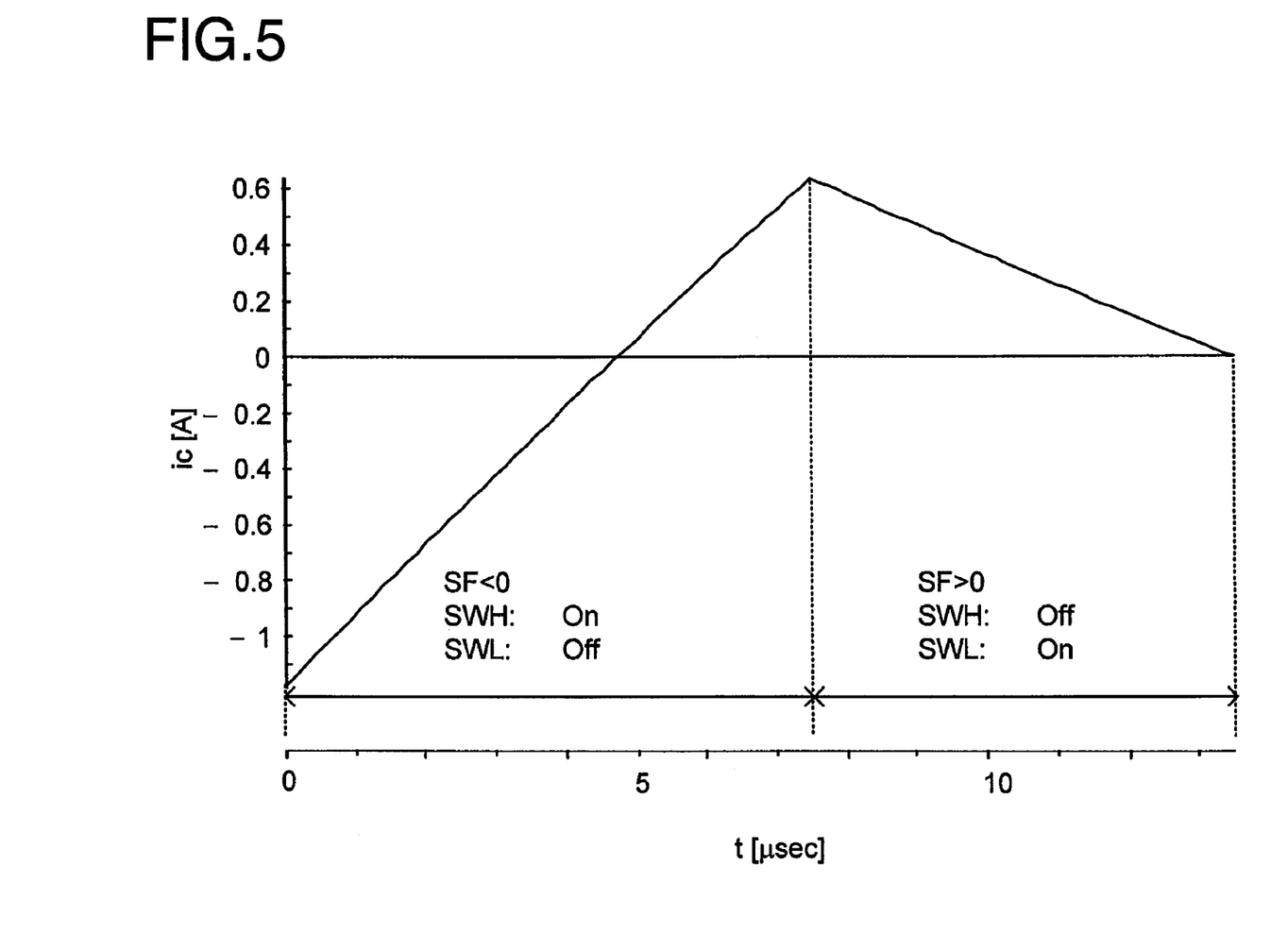
FIG. 5 is a diagram showing a performance of a current "ci" flowing in a capacitor "C0"

Next, operation of the DC to DC converter in the case that a current "iload" flowing in the load unit 101 is varying with time, is described with reference to FIGS. 4 to 6. FIG. 4 is a diagram showing a performance of an error voltage "Ve" versus time, when the current "iload" flowing in the load unit 101 increases 1.2 [A] in each of incremental steps at (t=0). The error voltage "Ve" follows (Ve=vc−Vref). FIG. 5 is a diagram showing a performance of a current "ic" versus time, when the current "iload" flowing in the load unit 101 increases 1.2 [A] in incremental steps at (t=0).

As shown in FIG. 5, if the current "iload" varies at (t=0), a current consumed by the load unit is supplied from the capacitor "C0". The current "ic" decreases by amount of the current consumed by varying. In FIG. 5, the current "ic" is −1.2 [A] when (t=0). On the other hand, in FIG. 4, the error voltage "Ve" progressively decreases, because the capacitor "C0" is being discharged. As shown in FIGS. 4 and 5, if the current "iload" varies at (t=0), both the error voltage "Ve" and the current "ic" have negative values, respectively. Accordingly, the SF has negative value and the control signal has positive value due to the equation (1) and the equation (2). Therefore, the switch controller 104 turns the first switch "SWH" on and the second switch "SWL" off.

Since the first switch "SWH" is on, a current flowing in the inductor "L" progressively increases. Also, the current "ic" increases with increasing the current flowing in the inductor "L". When ic=0 (t≈5 μsec in FIG. 5), the capacitor "C0" transits from being discharged to being charged.

When the SF and the control signal has a positive value after about t=7.5 μsec in FIG. 5, the switch controller 104 turns the first switch "SWH" off and the second switch "SWL" on. As a result, the current "ic" starts to decrease.

If amount of discharge from the capacitor "C0" is equal to amount of charge into the capacitor "C0", the error voltage "Ve" becomes 0 (Ve=0) and the output voltage "vc" becomes the reference voltage Vref (vc=Vref).

Figure 6:
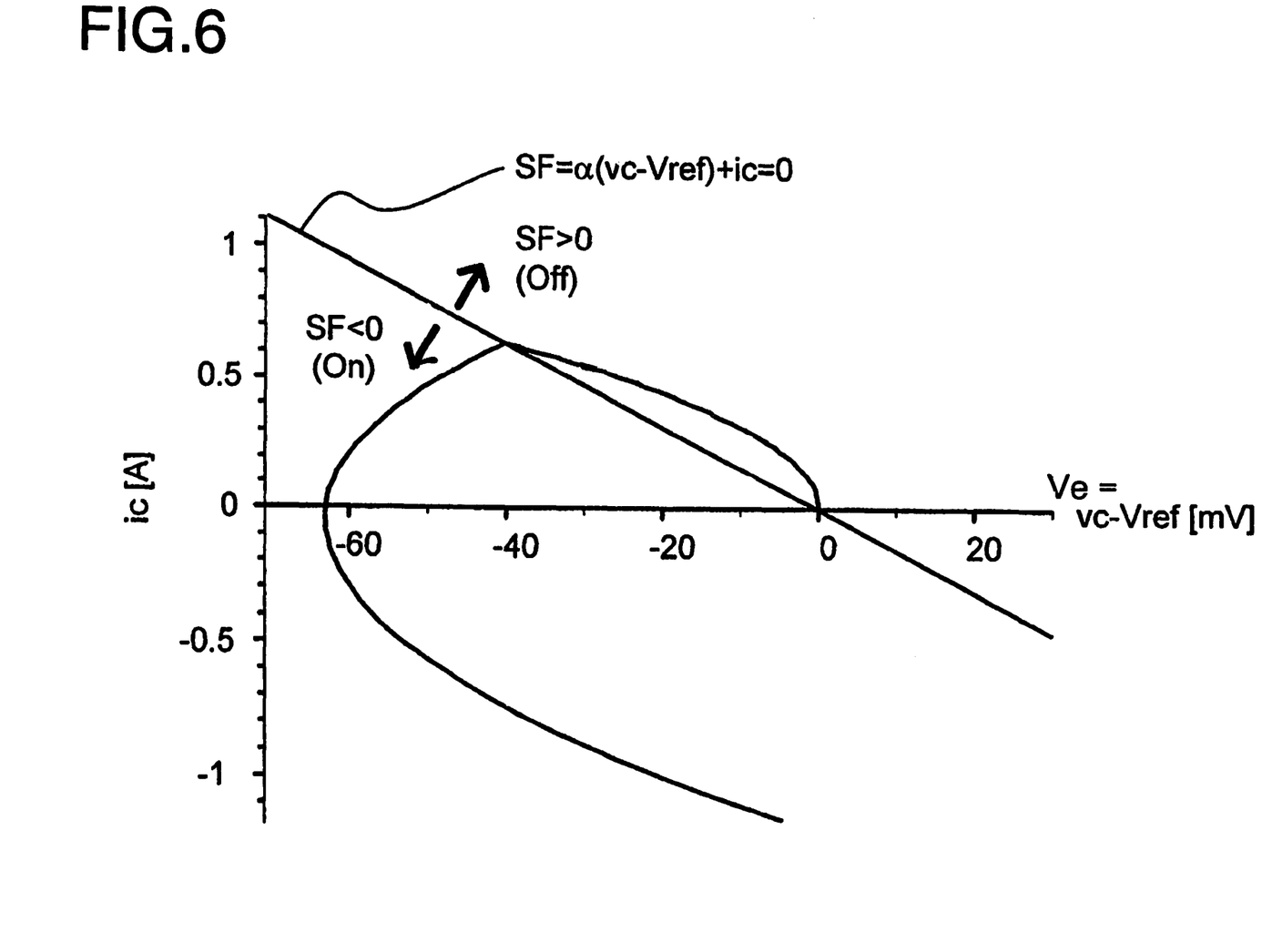
FIG. 6 is a diagram showing a response characteristic of the DC to DC convertor.

FIG. 6 is a diagram showing a response characteristic of the DC to DC convertor. The horizontal axis shows the error voltage "Ve" (=vc−Vref). The vertical axis shows the current "ic" flowing in the capacitor "C0". A point at (t=0) in FIGS. 4 and 5 is corresponding to a point located at (0, −1.2) in FIG. 6.

In FIG. 6, (SF=0) is expressed as a line passing through an original point and having a slope of −α. The line of (SF=0) is a border switching the first switch "SWH" and the second switch "SWL". If locus of (vc−Vref, ic) passes over the line of (SF=0), the first and second switches are switched. Therefore, a timing to switch the first switch "SWH" and the second switch "SWL" can be changed by adjusting value of α. For example, the value of α is adjusted as that the locus of (vc−Vref, ic) returns to the original point by only one-time switching. The value of α is determined based on amount of variation "Δ iload" of the current flowing in the load unit 101, inductance L of the inductor "L", capacitance C0 of the capacitor "C0".

According to the first embodiment, the DC to DC converter realizes the SF (Switching Function) which is a weighted sum of the current "ic" and the output voltage "vc", by only one circuit which is the SF generating circuit 103 shown in FIG. 2. Accordingly, circuit size of the DC to DC converter becomes smaller. Moreover, since the SF generating circuit 103 has only one operational amplifier 106, the DC to DC converter consumes less power compared with a DC to DC converter using two circuits for monitoring the current "ic" and the output voltage "vc" individually.

Description of the Second Embodiment

Figure 7:
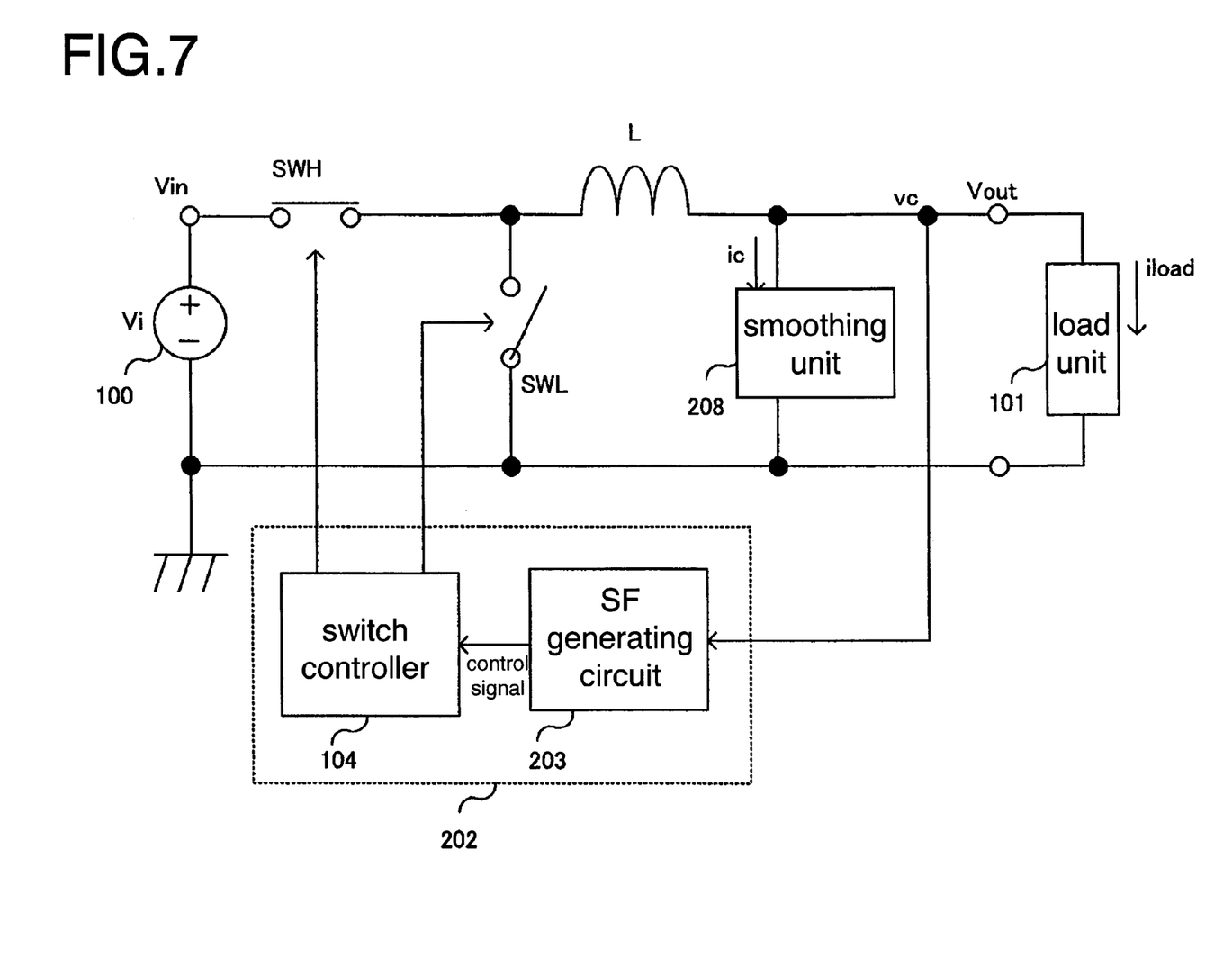
FIG. 7 is a diagram showing a configuration of a DC to DC converter according to the second embodiment.

A DC to DC converter according to the second embodiment is described with reference to FIG. 7. The DC to DC converter of the second embodiment shown in FIG. 2 has a same structure as the DC to DC converter of the first embodiment shown in FIG. 1, except a SF generating circuit 203 in a control unit 202 and a smoothing unit 208.

Figure 8:
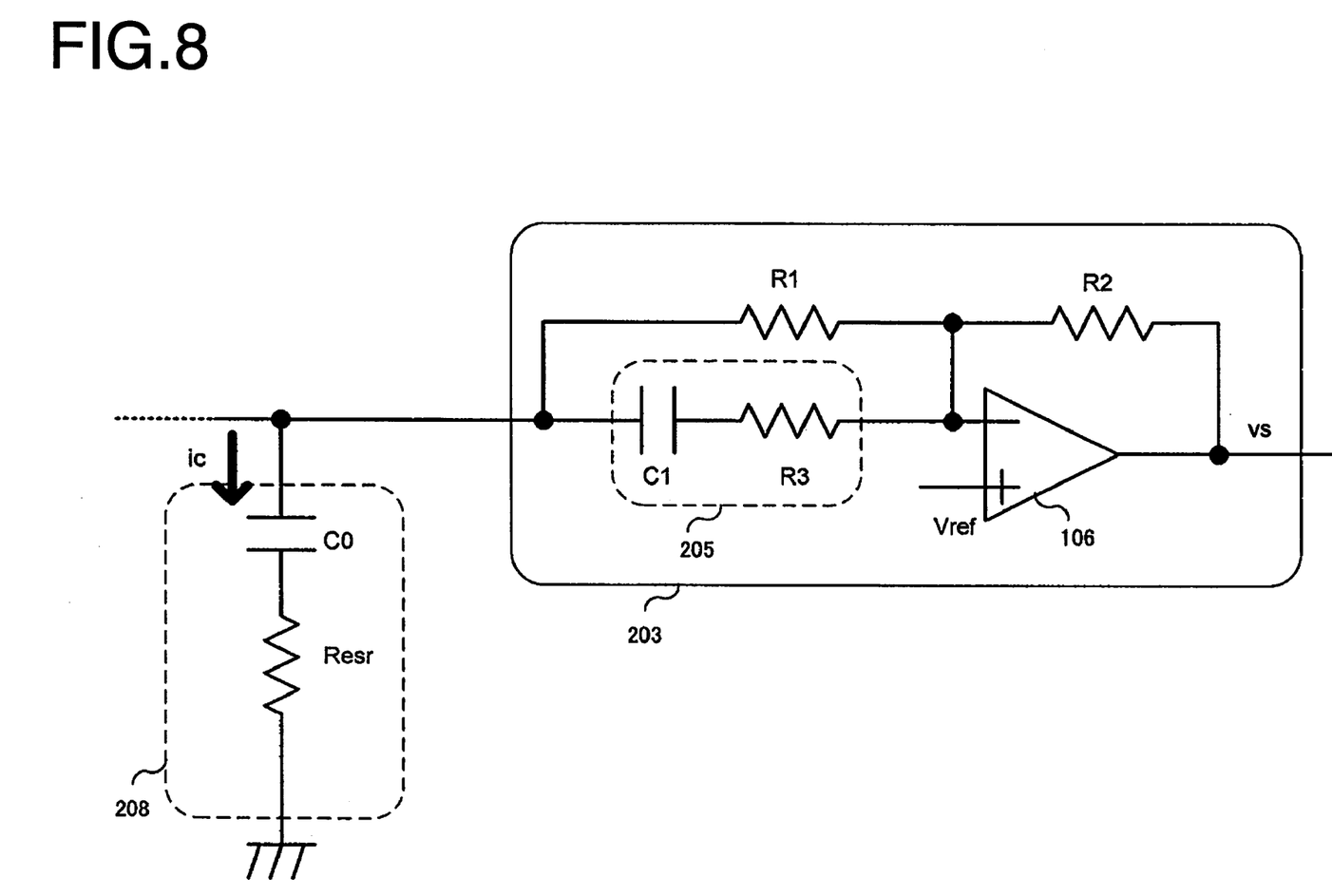
FIG. 8 is a diagram showing a configuration of a SF generating circuit and a smoothing unit.

FIG. 8 is a diagram showing a configuration of the SF generating circuit 203 and the smoothing unit 208. The smoothing unit 208 further includes an equivalent series resistance "Resr" in addition to the capacitor "C0". Actually, the equivalent series resistance "Resr" is come up by inserting the capacitor "C0".

The SF generating circuit 203 has a same structure as the SF generating circuit 103 of the first embodiment except a first impedance element 205. The first impedance element 205 includes the first capacitor "C1" and the third resistor element "R3" connected to the first capacitor "C1". One terminal of the third resistor element "R3" is connected to the other terminal of the first capacitor "C1". The other terminal of the third resistor element "R3" is connected to the inverting input terminal of the operational amplifier 106. A resistance value R3 of the third resistor element "R3" is expressed as (R3=N*Resr), where Resr is a resistance value of the equivalent series resistance "Resr". Impedance due to the first capacitor "C1" and the third resistor element "R3" is N times larger than impedance due to the capacitor "C0" and the equivalent series resistance "Resr". Therefore, a current "i1" (=ic/N) can be generated with high accuracy.

A small-signal transfer function of the SF generating circuit 103 is expressed by an equation (3).

$$\frac{v_s(s)}{v_c(s)} = -\frac{R2(1 + R1sC1 + sC1R3)}{R3(1 + R1sC1)} \quad (3)$$

Figure 9:
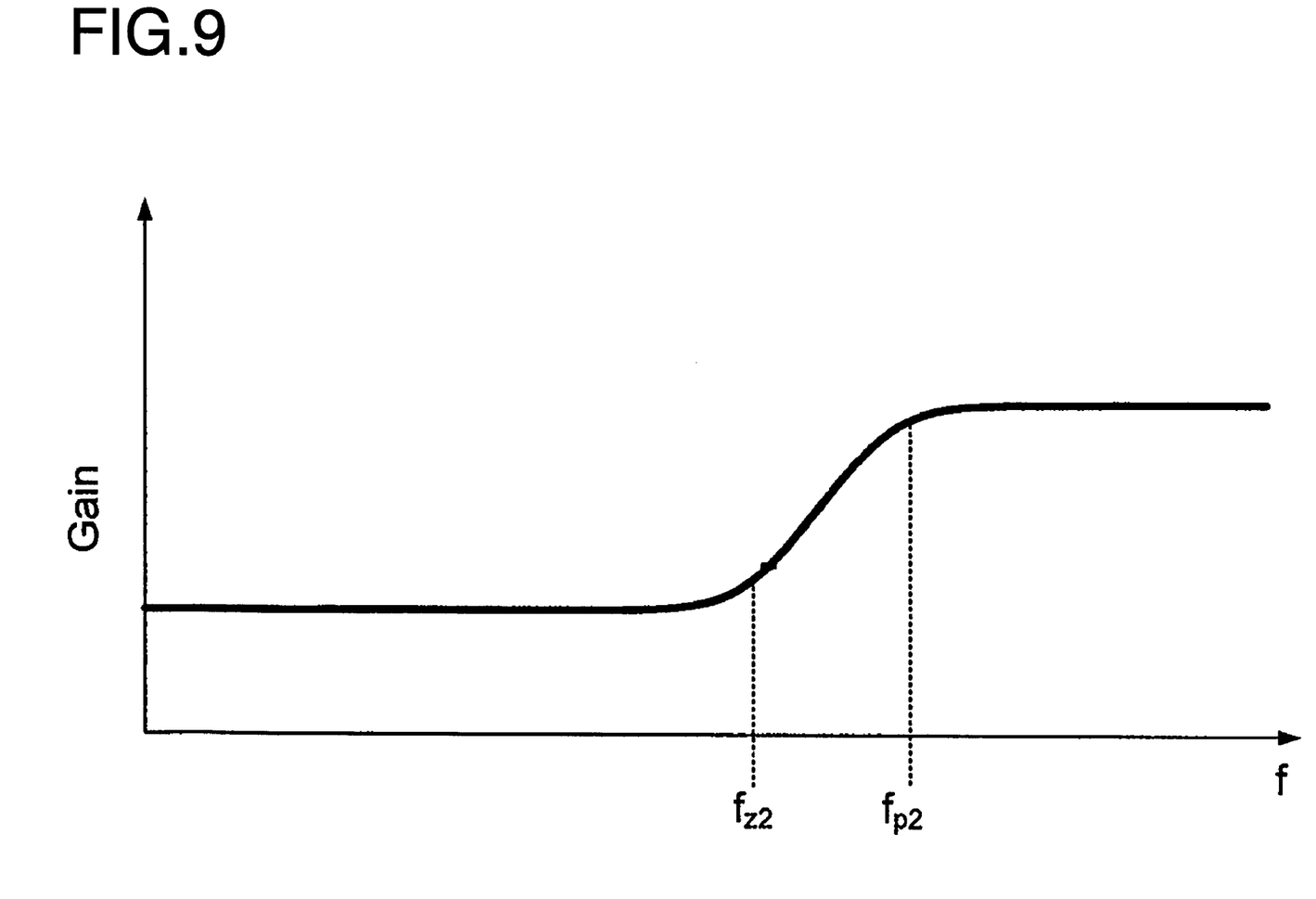
FIG. 9 is a diagram showing a gain characteristic due to a transfer function of the SF generating circuit.

FIG. 9 is a diagram showing a gain characteristic due to the transfer function of the equation (3). The horizontal axis shows frequency "f". The vertical axis shows gain "Gain". The gain characteristic in FIG. 9 is flat when f<$f_{z2}$, differential when $f_{z2}$<f<$f_{p2}$, and flat again when $f_{p2}$<f.

The frequencies $f_{z2}$ and $f_{p2}$ are respectively expressed by equations (4) and (5), which are based on the equation (3).

$$f_{z2} = \frac{1}{2\pi C1(R1 + R3)} \quad (4)$$

$$f_{p2} = \frac{1}{2\pi C1R1} \quad (5)$$

According to the second embodiment, the DC to DC converter achieves same effects as that of the first embodiment. Further, the DC to DC converter can detect the current "ic" flowing in the smoothing unit 208 with high accuracy by adding the third resistor element "R3" to the first impedance element 205, even if the smoothing unit 208 includes the equivalent series resistance "Resr".

Description of the Third Embodiment

Figure 10:
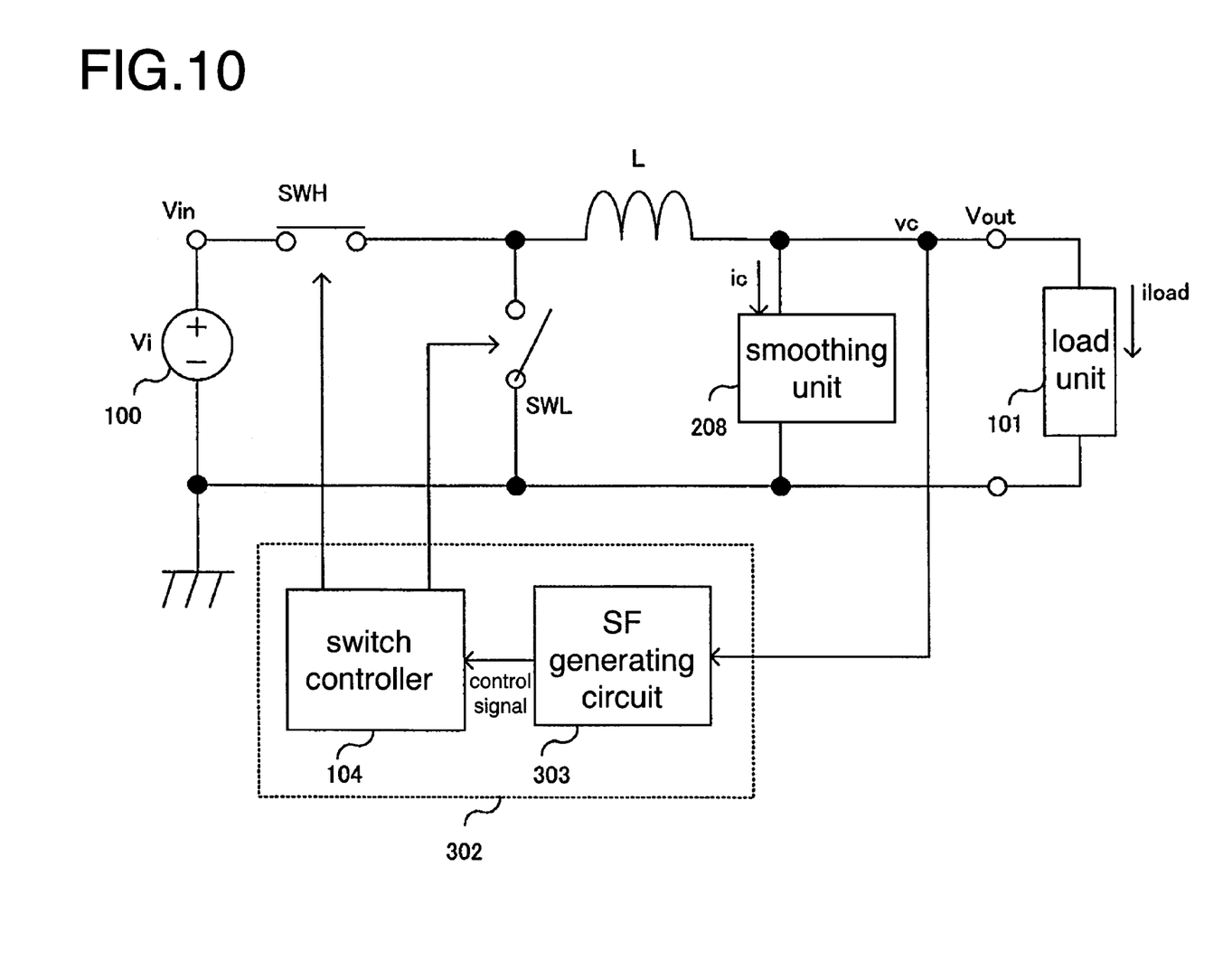
FIG. 10 is a diagram showing a configuration of a DC to DC converter according to the third embodiment.

A DC to DC converter according to the third embodiment is described with reference to FIG. 10. The DC to DC converter of the third embodiment shown in FIG. 10 has a same structure as the DC to DC converter of the second embodiment shown in FIG. 7, except a SF generating circuit 303 in a control unit 302.

Figure 11:
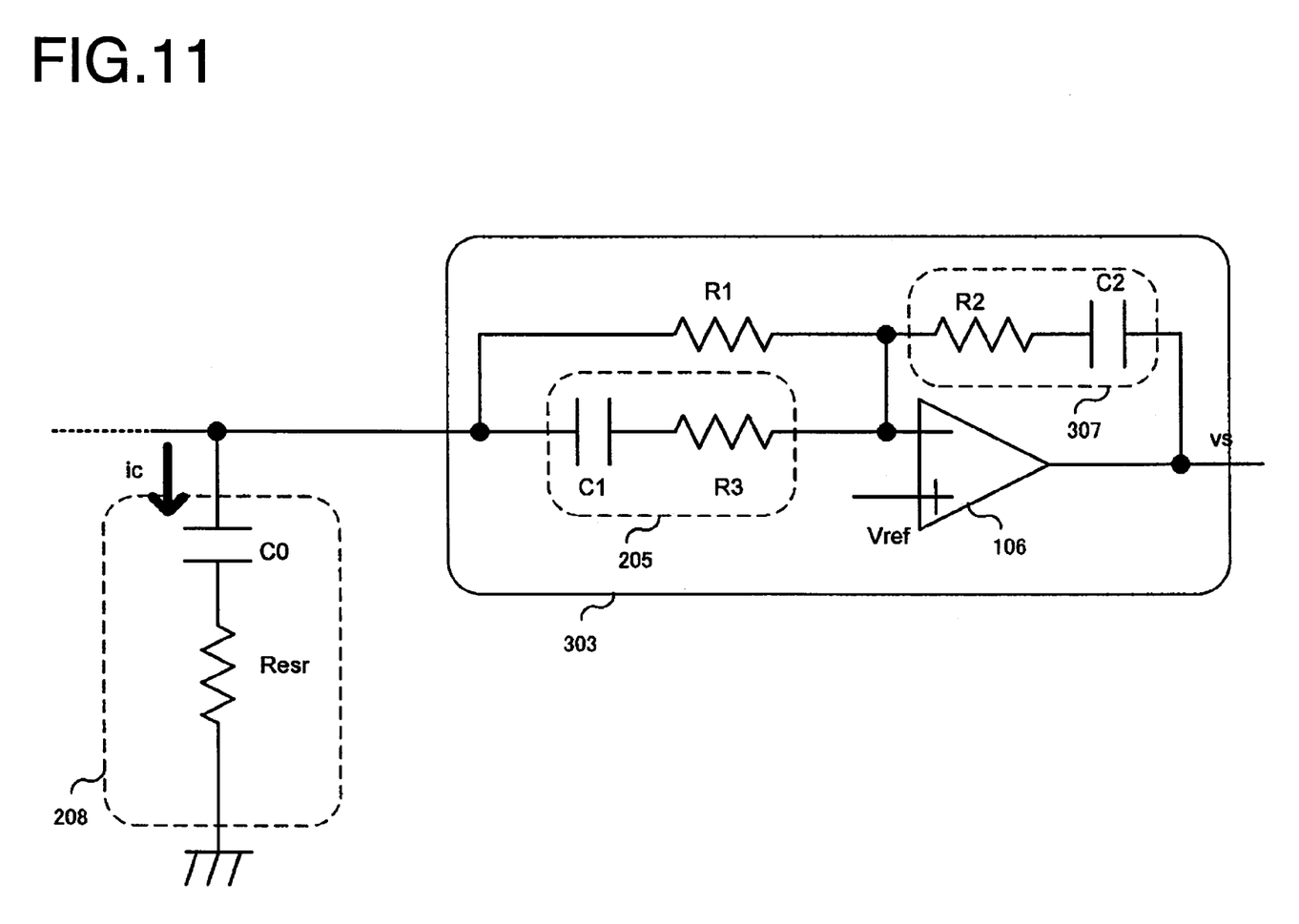
FIG. 11 is a diagram showing a configuration of a SF generating circuit.

FIG. 11 is a diagram showing a configuration of the SF generating circuit 303. The SF generating circuit 303 has a same structure as the SF generating circuit 203 of the second embodiment shown in FIG. 8, except the second impedance element 307. The second impedance element 307 includes a second capacitor "C2" and the second resistor element "R2" connected to the second capacitor "C2". One terminal of the second capacitor "C2" is connected to the other terminal of the second resistor element "R2". The other terminal of the second capacitor "C2" is connected to the control output terminal of the operational amplifier 106.

A small-signal transfer function of the SF generating circuit 303 is expressed by an equation (6).

$$\frac{v_s(s)}{v_c(s)} = -\frac{(R2sC2 + 1)(1 + R1sC1 + sC1R3)}{sC2R3(1 + R1sC1)} \quad (6)$$

Figure 12:
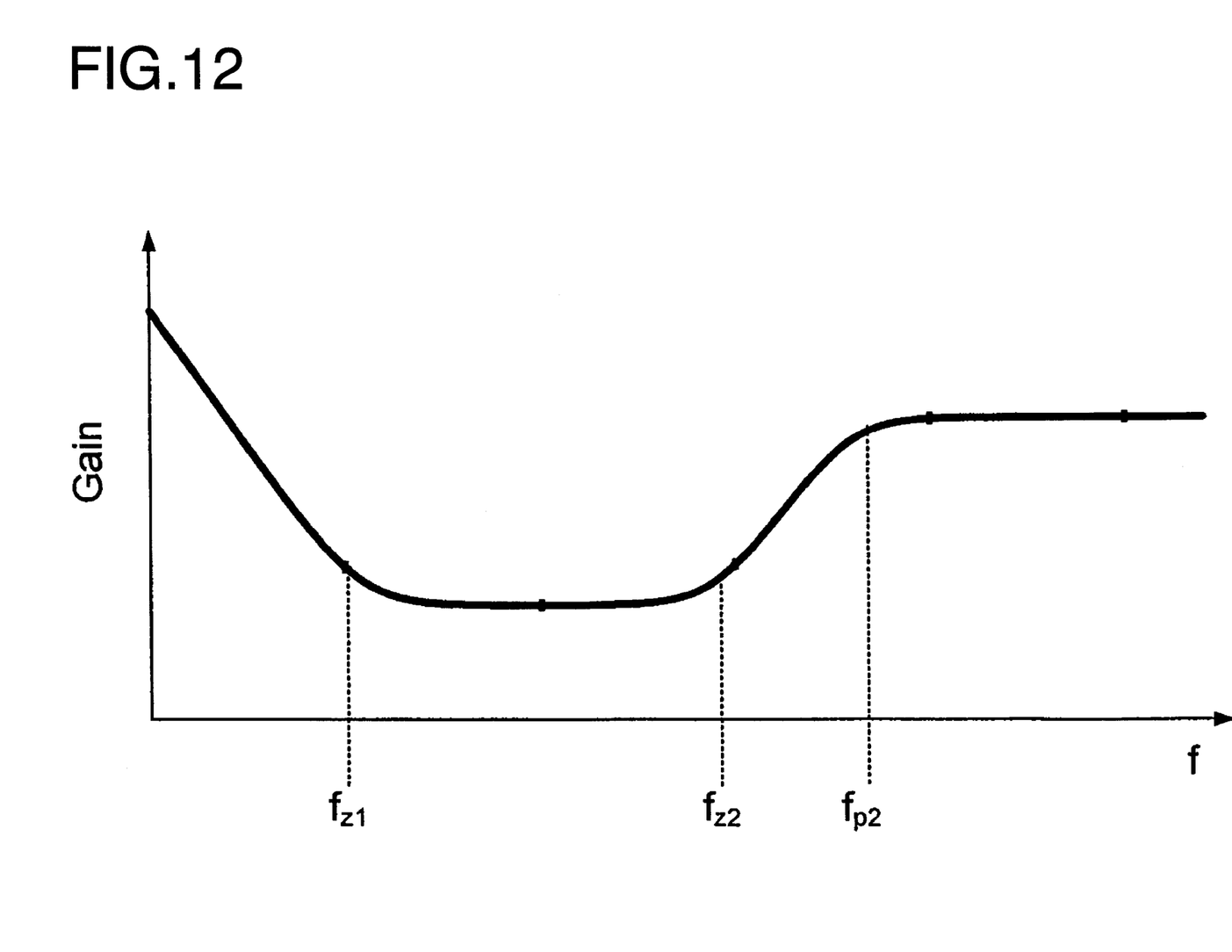
FIG. 12 is a diagram showing a gain characteristic due to a transfer function of the SF generating circuit.

FIG. 12 is a diagram showing a gain characteristic due to the transfer function of the equation (6). The horizontal axis shows frequency "f". The vertical axis shows gain "Gain". The gain characteristic when f<$f_{z2}$ in FIG. 12 due to the equation (6) is different from the gain characteristic shown in FIG. 9 due to the equation (3). The frequencies $f_{z1}$, $f_{z2}$ and $f_{p2}$ are respectively expressed by equations (7), (8) and (9), which are based on the equation (6).

$$f_{z1} = \frac{1}{2\pi C2 R2} \quad (7)$$

$$f_{z2} = \frac{1}{2\pi C1 (R1 + R3)} \quad (8)$$

$$f_{p2} = \frac{1}{2\pi C1 R1} \quad (9)$$

The frequencies $f_{z2}$ and $f_{p2}$ of the equations (8) and (9) are equal to the frequencies $f_{z2}$ and $f_{p2}$ of the equations (4) and (5). This means that the SF generating circuit 303 shown in FIG. 11 achieves a same performance as that of the SF generating circuit 203 shown in FIG. 8, when $f > f_{z1}$. In general, response to variation of a current flowing in the load unit of the DC to DC converter depends on the performance in a high frequency area. Therefore, if the frequency $f_{z1}$ is small, the DC to DC converter keeps a same response performance between before and after adding the second capacitor "C2". Adding the second capacitor "C2" to the DC to DC converter leads to increase gain around a DC. Accordingly, the DC to DC converter leads to increase a loop gain due to a control loop in the DC to DC converter. The control loop includes the control unit 302, the first switch "SWH", the second switch "SWL", the inductor "L", the smoothing unit, and the load unit. As a result, the error voltage "Ve" (=vc−Vref) can be decreased.

According to the third embodiment, the DC to DC converter achieves same effects as that of the second embodiment. Further, the DC to DC converter obtains value of integral of the output voltage "vc" and improves the loop gain in the low frequency area of ($f < f_{z1}$) by adding the second capacitor "C2" to the second impedance element 307.

While certain embodiments have been described, these embodiments have been presented by way of example only, and are not intended to limit the scope of the inventions. Indeed, the novel systems described herein may be embodied in a variety of other forms; furthermore, various omissions, substitutions and changes in the form of the methods and systems described herein may be made without departing from the sprit of the inventions. The accompanying claims and their equivalents are intended to cover such forms or modifications as would fall within the scope and spirit of the inventions.

What is claimed is:

1. A DC to DC converter for converting an input voltage into an output voltage, the output voltage being lower than the input voltage, the converter comprising:
    an input terminal into which the input voltage is inputted;
    an output terminal from which the output voltage is outputted;
    a first switch to switch on and off, a first terminal of the first switch being connected to the input terminal;
    a second switch to switch on and off, a first terminal of the second switch being connected to a second terminal of the first switch and a second terminal of the second switch being connected to a ground terminal;
    an inductor, a first terminal of the inductor being connected to the first switch, a second terminal of the inductor being connected to the output terminal;
    a smoothing unit, a first terminal of the smoothing unit being connected to the second terminal of the inductor and a second terminal of the smoothing unit being connected to the ground terminal;
    a first impedance element, a first terminal of the first impedance element being connected to the first terminal of the smoothing unit;
    a first resistor element, a first terminal of the first resistor element being connected to the first terminal of the first impedance element and a second terminal of the first resistor element being connected to a second terminal of the first impedance element;
    an operational amplifier having
        an inverting input terminal being connected to the second terminal of the first impedance element,
        a non-inverting input terminal configured to receive a reference voltage, and
        a control output terminal to output a control signal; and
    a control unit configured to control the first and second switches using the control signal of the operational amplifier, wherein the control unit includes a comparator to judge polar character of the control signal and to control the first and second switches according to the polar character and,
    wherein the control unit is configured to turn one of the first switch and the second switch on and another one of the first switch and the second switch off, if the control signal has a positive value, and is further configured to turn the one of the first switch and the second switch off and the another one of the first switch and the second switch on, if the control signal has a negative value.

2. The converter of claim 1, wherein the first impedance element includes a first capacitor element.

3. The converter of claim 1, wherein the second impedance element includes a second resistor element.

4. The converter of claim 2, wherein the first impedance element further includes a third resistor element connected in series with the first capacitor element.

5. The converter of claim 3, wherein the second impedance element further includes a second capacitor element connected in series with the second resistor element.

6. The converter of claim 1, wherein the control unit is configured to turn the first switch on and the second switch off, if the control signal has a positive value.

7. The converter of claim 1, wherein the control unit is configured to turn the first switch off and the second switch on, if the control signal has a negative value.

8. The converter of claim 1, wherein the control signal is generated based on the output voltage, a current of the smoothing unit, and the reference voltage.

9. The converter of claim 1, wherein the control signal is a weighted sum of a current of the smoothing unit and the output voltage.

10. The converter of claim 1, further comprising a second impedance element, a first terminal of the second impedance element being connected to the second terminal of the first resistor element, and a second terminal of the second impedance element being connected the control output terminal of the operational amplifier.

* * * * *